United States Patent
Calapodescu et al.

(10) Patent No.: US 10,489,439 B2
(45) Date of Patent: Nov. 26, 2019

(54) SYSTEM AND METHOD FOR ENTITY EXTRACTION FROM SEMI-STRUCTURED TEXT DOCUMENTS

(71) Applicant: Xerox Corporation, Norwalk, CT (US)

(72) Inventors: Ioan Calapodescu, Grenoble (FR); Nicolas Guerin, Notre-Dame-de-Mésage (FR); Fanchon Jacques, Meylan (FR)

(73) Assignee: XEROX CORPORATION, Norwalk, CT (US)

( * ) Notice: Subject to any disclaimer, the term of this patent is extended or adjusted under 35 U.S.C. 154(b) by 781 days.

(21) Appl. No.: 15/098,856

(22) Filed: Apr. 14, 2016

(65) Prior Publication Data

US 2017/0300565 A1    Oct. 19, 2017

(51) Int. Cl.
| | | |
|---|---|---|
| *G06F 16/00* | (2019.01) | |
| *G06N 20/00* | (2019.01) | |
| *G06F 16/35* | (2019.01) | |
| *G06F 16/33* | (2019.01) | |
| *G06F 16/30* | (2019.01) | |
| *G06F 16/27* | (2019.01) | |
| *G06F 16/93* | (2019.01) | |
| *G06F 16/332* | (2019.01) | |

(52) U.S. Cl.
CPC .......... *G06F 16/353* (2019.01); *G06F 16/278* (2019.01); *G06F 16/30* (2019.01); *G06F 16/3325* (2019.01); *G06F 16/3344* (2019.01); *G06F 16/35* (2019.01); *G06F 16/93* (2019.01); *G06N 20/00* (2019.01)

(58) Field of Classification Search
CPC ...... G06F 16/93; G06F 16/148; G06F 16/355; G06F 16/36; G06F 16/951; G06F 16/353; G06F 16/35; G06F 16/285; G06F 16/38; G06F 16/313; G06F 16/3334; G06F 16/374; G06F 16/30; G06F 16/345; G06F 16/41; G06F 16/278; G06F 16/3344; G06F 16/3325; G06N 20/00

See application file for complete search history.

(56) References Cited

U.S. PATENT DOCUMENTS 5,809,476 A * 9/1998 Ryan .................. G06Q 50/22
                                                           705/2
6,263,335 B1   7/2001 Paik et al.
(Continued)

OTHER PUBLICATIONS

R. Krishnamoorthy et al., "New Optimized Agglomerative Clustering Algorithm Using Multilevel Threshold for Finding Optimum Number of Clusters on Large Data Set", International Conference on Emerging Trends in Science, Engineering and Technology, IEEE 2012, pp. 121-129.*

(Continued)

*Primary Examiner* — Srirama Channavajjala
(74) *Attorney, Agent, or Firm* — Fay Sharpe LLP

(57) ABSTRACT

A method for extracting entities from a text document includes, for at least a section of a text document, providing a first set of entities extracted from the at least a section, clustering at least a subset of the extracted entities in the first set into clusters, based on locations of the entities in the document. Complete ones of the clusters of entities are identified. Patterns for extracting new entities are learned based on the complete clusters. New entities are extracted from incomplete clusters based on the learned patterns.

20 Claims, 9 Drawing Sheets

(56) References Cited

U.S. PATENT DOCUMENTS

| | | | |
|---|---|---|---|
| 6,311,152 | B1 | 10/2001 | Bai et al. |
| 6,751,614 | B1* | 6/2004 | Rao .................. G06F 16/355 |
| 6,975,766 | B2 | 12/2005 | Fukushima |
| 7,171,350 | B2 | 1/2007 | Lin et al. |
| 8,244,551 | B1* | 8/2012 | Mund .................. G06Q 10/10 705/1.1 |
| 8,625,886 | B2 | 1/2014 | Bart et al. |
| 9,836,453 | B2* | 12/2017 | Radford ............. G06F 17/277 |
| 2003/0236659 | A1* | 12/2003 | Castellanos ......... G06F 17/271 704/4 |
| 2006/0036614 | A1* | 2/2006 | Simske ................. G06F 16/35 |
| 2008/0071519 | A1 | 3/2008 | Brun |
| 2008/0319978 | A1 | 12/2008 | Brun et al. |
| 2009/0204596 | A1 | 8/2009 | Brun et al. |
| 2009/0319257 | A1* | 12/2009 | Blume .................. G06F 17/278 704/7 |
| 2009/0319500 | A1* | 12/2009 | Agrawal ............... G06F 16/93 |
| 2010/0004925 | A1 | 1/2010 | Ah-Pine et al. |
| 2010/0082331 | A1 | 4/2010 | Brun et al. |
| 2010/0082613 | A1* | 4/2010 | Liu .................. G06F 16/334 707/726 |
| 2010/0198827 | A1* | 8/2010 | Yacoub ............ G06K 9/00463 707/739 |
| 2010/0223214 | A1* | 9/2010 | Kirpal .................. G06F 16/86 706/12 |
| 2010/0312725 | A1 | 12/2010 | Privault et al. |
| 2010/0313124 | A1 | 12/2010 | Privault et al. |
| 2011/0191274 | A1* | 8/2011 | Yu .................. G06N 20/00 706/12 |
| 2011/0213742 | A1* | 9/2011 | Lemmond .......... G06F 16/3344 706/13 |
| 2011/0270604 | A1* | 11/2011 | Qi .................. G06F 17/271 704/9 |
| 2012/0078612 | A1* | 3/2012 | Kandekar ........... G06F 17/2745 704/9 |
| 2012/0166472 | A1 | 6/2012 | Hoppenot et al. |
| 2012/0254790 | A1 | 10/2012 | Colombino et al. |
| 2013/0006636 | A1* | 1/2013 | Mizuguchi ........... G06F 16/313 704/245 |
| 2013/0013612 | A1* | 1/2013 | Fittges ................. G06F 16/353 707/739 |
| 2013/0290206 | A1 | 10/2013 | Desai et al. |
| 2014/0163951 | A1 | 6/2014 | Nikoulina et al. |
| 2014/0214821 | A1* | 7/2014 | Oliver .................. H04L 51/18 707/730 |
| 2014/0281938 | A1 | 9/2014 | Pavlopoulou |
| 2015/0106376 | A1* | 4/2015 | Gattiker ............... G06F 16/148 707/738 |
| 2015/0169510 | A1 | 6/2015 | Dejean et al. |
| 2015/0186847 | A1 | 7/2015 | Menon et al. |
| 2015/0269527 | A1 | 9/2015 | Stanton et al. |
| 2015/0286629 | A1 | 10/2015 | Abdel-Reheem et al. |
| 2015/0370472 | A1 | 12/2015 | Privault et al. |

OTHER PUBLICATIONS

Sneha Kumari et al., "Automated Resume Extraction and Candidate Selection System", International Journal of Innovative Technology & Adaptive Management (IJITAM),ISSN: 2347-3622, vol. 2, Issue-2 , Nov. 2014 ; pp. 1-4.*

Ciravegna, et al., "LearningPinocchio—Adaptive Information Extraction," Natural Language Engineering 1 (1), pp. 1-21 (2001).

De Sitter, et al., "Information Extraction via Double Classification," *Proc. Int'l Workshop on Adaptive Text Extraction and Mining*, pp. 66-73 (2003).

Drozdzynski, et al., "Shallow Processing with Unification and Typed Feature Structures—Foundations and Applications," *Künstliche Intelligenz (KI)* vol. 18, No. 1, p. 17 (2004).

Hochreiter, et al., "Long short-term memory," Neural Computation vol. 9, No. 8, pp. 1735-1780, (1997).

Klügl, "Context-specific Consistencies in Information Extraction," Würzburg University Press, pp. 1-194 (2014).

Lafferty, et al., "Conditional random fields: Probabilistic models for segmenting and labeling sequence data," *Int'. Conf. on Machine Learning (ICML)*, pp. 282-289 (2001).

Lavelli, et al., "A critical survey of the methodology for IE evaluation," *Proc. 4th Int'l Conf. on Language Resources and Evaluation (LREC 2004)*, pp. 1655-1658 (2004).

Kaczmarek, "Information Extraction from CV," Proc. Business Information Systems (BIS 2005), Poznań, Poland, pp. 1-7, (2005).

Kopparapu, "Automatic extraction of usable information from unstructured resumes to aid search," *2010 IEEE International Conference on Progress in Informatics and Computing (PIC)*, vol. 1, pp. 99-103 (2010).

Maheshwari et al., "An approach to extract special skills to improve the performance of resume selection," *Databases in Networked Information Systems*, pp. 256-273 (2010).

O'Neill, et al., "DISCO: Intelligent Help for Document Review," Workshop DESI at 12th Int'l Conf. on Artificial Intelligence & Law (ICAIL), pp. 1-10 (2009).

Privault, et al., "A new tangible user interface for machine learning document review," *Artificial Intelligence and Law*, vol. 18(4), pp. 459-479 (2010).

Wikipedia, "Applicant Tracking System," pp. 1-2, 2016, Available from: https://en.wikipedia.org/wiki/Applicant_tracking_system.

Yu, et al., "Resume information extraction with cascaded hybrid model," *Proc. 43rd Annual Meeting on Association for Computational Linguistics*, pp. 499-506 (2005).

Singh, et al., "PROSPECT: A System for Screening Candidates for Recruitment," In Proceedings of the 19th ACM international conference on Information and knowledge management, pp. 659-668 (Oct. 2010).

\* cited by examiner

| | |
|---|---|
| Complete-cluster ¶<br>Org,·City,·State,·Date,·<br>NL,·Job ¤ | *BBN TECHNOLOGIES*, Cambridge, MA Feb. 2006 Nov. 2008 }20<br>Research Engineer / Software Developer<br>*Conducted state of the art research in the areas of NLP and information extraction<br>*Worked on an Information Extraction engine, improving it, speeding it up. |
| Complete-cluster ¶<br>Org,·City,·State,·Date,·<br>NL,·Job ¤ | *CARNEGIE MELLON UNIVERSITY*, Pittsburgh, PA Fall 2002 Jan. 2006 }22<br>Research Assistant<br>*Conducted research in the areas of Machine Learning, Bioinformatics<br>Computer Vision, Developed and implemented novel algorithms. |
| Incomplete-cluster ¶<br>Missing-Org-and-City¤ | *BAOBAB TECHNOLOGIES*, Hod-Hasharon, Israel Oct. 2000 Jun. 2002 }24<br>Software Engineer — 80<br>*Baobab Technologies developed robust spoken mixed-initiative dialog<br>for domains such as banking and travel reservations<br>*Involved with this start-up company from its beginning. |
| Incomplete-cluster ¶<br>Missing-the-internship<br>information ¤ | *IBM HAIFA RESEARCH LAB*, Haifa, Israel Jun. 2000 Oct. 2000 }26<br>Internship at the Information Retrievial group.<br>*Worked on a project that allowed training of different granularity<br>*Programmed in Java. — 90 |

FIG. 1

| Comments | Annotated text after first pass extraction | Chunk sequence (used for learning & runtime) |
|---|---|---|
| Complete cluster | Software Developer March 04 March 05<br>Development Team<br>*Cost Technology, Inc*<br>Tools: Visual Basic, Excel | JOB DATE NL<br>UPP GRP NL<br>UPP ORGM NL<br>UPP PUNCT UPP COMM UPP |
| Incomplete cluster: Missed company name Citigroup | Sr. Analyst May 07 Feb 09<br>Financial Analysis Dept<br>Citigroup<br>Tools: SAS and related packages | JOB DATE NL<br>UPP GRP NL<br>UPP NL<br>UPP PUNCT ALLUP AND CHK UPP |

94 ← (arrow to Cost Technology, Inc)
96 ← (arrow to Tools: SAS and related packages)

FIG. 7

| | |
|---|---|
| 46 | PROFESSIONAL EXPERIENCE }SELECTED WORK EXPERIENCE |
| 48 | DATE RANGE  ORGANIZATION  LOCATION<br>1) JULY 2003 SEPTEMBER 2004  ABC SOFTWARE SERVICES PTV. LTD. MUMBAI, INDIA |
| 49 | JOB TITLE<br>POSITION: SOFTWARE ENGINEER |
| 50 | SELECTED PROJECTS: |
| 51 | DATE RANGE<br>AUGUST 2003 SEPTEMBER 2004 COALNET A MULTI-TIER WEB-BASED J2EE APPLICATION |
| 53 | DATE RANGE  ORGANIZATION  LOCATION<br>2) OCTOBER 2004 JULY 2005 PGT CONSULTANCY SERVICES LTD. MUMBAI, INDIA |

FIG. 8

SYSTEM AND METHOD FOR ENTITY EXTRACTION FROM SEMI-STRUCTURED TEXT DOCUMENTS

BACKGROUND

The exemplary embodiment relates to entity extraction and finds particular application in connection with the extraction of entities from semi-structured documents, such as resumes.

Recruiting companies and large enterprises receive hundreds of resumes every day. In order to classify, search, or sort the resumes, recruiters use dedicated tools called Applicant Tracking Systems (ATS). These tools populate a database with information about candidates, such as personal information, skills, and companies they have worked for, etc. This information may be captured in different ways, such as manual entry by a recruiter, manual entry by the candidate on a recruitment platform, or automatic extraction from the candidate's resume.

While a resume is a well-defined document, with fairly standard sections (personal information, education, experience, etc.), the format and presentation may vary widely. Also, multiple file formats are possible (PDF, Microsoft Office Word document, text file, html, etc.), the order of the sections may vary (e.g., the education section may be at the beginning or at the end), and the content of the sections may have many different forms (list of structured paragraphs, tables, full sentences or list of words). Additionally, depending on the professional domain, there may be a specific vocabulary or style. It is therefore difficult to ensure that all the pertinent information is extracted.

Various methods of information extraction have been used to extract information from text, such as rule-based and machine learning methods. For an overview, see Klügl, "Context-specific Consistencies in Information Extraction," Würzburg University Press, 2014, which discusses resumes, as a particular example. The UIMA Ruta rule-based system for information extraction and general natural language processing is described as well as machine learning techniques based on Conditional Random Fields (CRF) and extensions.

One approach known as "stacked Conditional Random Fields" exploits context-specific consistencies by combining two linear-chain CRFs in a stacked learning framework. The first CRF adds high-quality features to the input of a second CRF. Both CRFs work on the same data, but with different feature sets. While this method improves the results over a single CRF, it is less effective when the entities are far apart, as in a resume where a single block of text describing the candidate's experience can be several hundred words long.

Methods to address the wide spacing of entities can involve higher-order models, such as Comb-chain CRF and Skyp-chain CRF, which add long-range dependencies. Comb-chain CRF uses a classifier, trained to detect the boundaries of the entities. The output functions influence the model to assign a higher likelihood to label sequences that confirm with the description of the classifier. Skyp-chain CRF is a variant of skip-chain CRF. But instead of creating additional edges between labels, whose tokens are similar or identical, this approach adds long-range dependencies based on the patterns occurring in the predicted label sequence and the classification result. These two extensions of CRF provide improvements in performance over linear-chain CRF, for both resume and references extraction. However, they both rely on boundary detection to detect consistencies, which can miss some entities.

One system which is designed for entity detection in resumes is described in Amit Singh, et al., "PROSPECT: a system for screening candidates for recruitment," *Proc. 19th ACM Int'l Conf. on Information and Knowledge management*, pp. 659-668, 2010. The PROSPECT system is a web portal for screening candidates. The system includes text extraction, resume segmentation and information extraction components, using approaches such as SVMs or CRFs. The number of years of experience in a specific domain is computed, which is used for ranking of resumes by giving higher scores to the resumes matching more closely the requirements of the job offer (e.g., "at least 6 years of J2EE experience").

A cascaded model for entity extraction is described Kun Yu, et al., "Resume information extraction with cascaded hybrid model," *Proc. 43rd ACL Annual Meeting*, pp. 499-506, 2005. A first step entails segmentation into identified sections (personal information, education, experience). Entity extraction is performed in a second step. Based on the type of section, the most appropriate entity extraction task is used, either HMM or classification.

A system that automatically extracts information from resumes to populate a database and allow searching is described in Kopparapu, "Automatic extraction of usable information from unstructured resumes to aid search," 2010 *IEEE Int'l Conf. on Progress in Informatics and Computing (PIC)*, vol. 1, pp. 99-103, 2010. Other work on resumes is described in Kaczmarek, "Information Extraction from CV," Proc. Business Information Systems, pp. 1-7, 2005; and Maheshwari et al., "An approach to extract special skills to improve the performance of resume selection," *Databases in Networked Information Systems*, pp. 256-273, 2010. Work has also been done on information extraction from job descriptions. See, Ciravegna, et al., "Learning Pinocchio— Adaptive Information Extraction," Natural Language Engineering 1 (1): 1-21, 2001.

Many of these systems do not have reliably good performance and tend to miss some of the information sought.

INCORPORATION BY REFERENCE

The following references, the disclosures of which are incorporated herein in their entireties, by reference are mentioned:

U.S. Pub. No. 20150169510, published Jun. 17, 2015, entitled METHOD AND SYSTEM OF EXTRACTING STRUCTURED DATA FROM A DOCUMENT, by Hervé Dejean, et al. describes a sequence-based method for identifying repetitive contiguous patterns of a document's layout. A reading direction of the document is identified, followed by application of frequency based techniques to extract missing pieces of information.

The analysis of document layout is described in U.S. Pat. No. 8,625,886, issued Aug. 9, 2012, entitled FINDING REPEATED STRUCTURE FOR DATA EXTRACTION FROM DOCUMENT IMAGES, by Evgeniy Bart, et al.; U.S. Pub. No. 20140281938, published Sep. 18, 2014, entitled FINDING MULTIPLE FIELD GROUPINGS IN SEMI-STRUCTURED DOCUMENTS, by Christina Pavlopoulou.

User interfaces suitable for document review are described in U.S. Pub. Nos. 20100312725, published Dec. 9, 2010, entitled SYSTEM AND METHOD FOR ASSISTED DOCUMENT REVIEW, by Caroline Privault, et al.; 20100313124, published Dec. 9, 2010, entitled MANIPULATION OF DISPLAYED OBJECTS BY VIRTUAL MAGNETISM, by Caroline Privault, et al.; 20120166472, published Jun. 28, 2012, entitled SYSTEM AND METHOD FOR COLLABORATIVE GRAPHICAL SEARCHING WITH TANGIBLE QUERY OBJECTS ON A MULTI-TOUCH TABLE, by Yves Hoppenot, et al.; 20120254790, published Oct. 4, 2012, entitled DIRECT, FEATURE-BASED AND MULTI-TOUCH DYNAMIC SEARCH AND MANIPULATION OF IMAGE SETS, by Tommaso Colombino, et al.; and 20150370472, published Dec. 24, 2015, entitled 3-D MOTION CONTROL FOR DOCUMENT DISCOVERY AND RETRIEVAL, by Caroline Privault, et al.

Applicant tracking systems are described, for example, in U.S. Pub. Nos. 20150186847, published Jul. 2, 2015, entitled Intelligent Tool for Matching Candidates to Job Opportunities, by Krishnadas Menon, et al.; 20150269527, published Sep. 24, 2015, entitled CLIENT DRIVEN APPLICANT TRACKING SYSTEM AND ASSOCIATED METHOD TO MANAGE MULTIPLE JOB REPORTS, by Roger John Stanton, et al.; and 20130290206, published Oct. 31, 2013, entitled, METHOD AND APPARATUS FOR ELECTRONIC JOB RECRUITING, by Sheeroy Desai, et al.

BRIEF DESCRIPTION

In accordance with one aspect of the exemplary embodiment, a method for extracting entities from a text document includes for at least a section of a text document, providing a first set of entities extracted from section. At least a subset of the extracted entities in the first set is clustered into clusters, based on locations of the entities in the document. Complete clusters of entities are identified from these clusters. Patterns are learned for extracting new entities based on the complete clusters. New entities are extracted from incomplete clusters based on the learned patterns.

At least one of the providing of the first set of entities, identifying complete clusters, learning patterns and extracting new entities may be performed with a processor device.

In accordance with another aspect of the exemplary embodiment, a system for extracting entities from text documents includes a first entity extraction component for providing a first set of entities extracted from at least a section of a text document. A second entity extraction component extracts new entities from the section of the text document. The second entity extraction component includes a clustering component for clustering at least a subset of the extracted entities in the first set into clusters, based on locations of the entities in the document, a cluster completeness component for identifying complete clusters of entities from the clusters, and a pattern recognition component for learning patterns for extracting new entities based on the complete clusters and extracting new entities from incomplete clusters based on the learned patterns. A processor implements at least the second entity extraction component.

In accordance with another aspect of the exemplary embodiment, a method for extracting entities from a resume includes segmenting the resume into sections. A first set of entities and respective entity class labels is extracted from the section with at least one of grammar rules, a probabilistic model, and a lexicon. At least a subset of the extracted entities in the first set is clustered into clusters, based on locations of the entities in the resume. Complete clusters of entities are identified from these clusters. Patterns for extracting new entities are learned based on the labels of the entities in the complete clusters. New entities are extracted from incomplete clusters based on the learned patterns. Information based on the extracted new entities in the resume is output.

At least one of the segmenting, extracting the first set of entities, clustering, identifying complete clusters, learning patterns, and extracting new entities may be performed with a processor device.

BRIEF DESCRIPTION OF THE DRAWINGS

FIG. 1 illustrates part of an example resume;

FIG. 7 shows annotations of an example resume in a first pass and extracted chunk sequences;

FIG. 8 shows an example of a resume annotated with BRAT; and

DETAILED DESCRIPTION

Aspects of the exemplary embodiment relate to a system and method for entity extraction from resumes (or curriculum vitae (CVs)). These text documents each describe, in a natural language, such as English, the personal details, education, qualifications, and job experience of a particular candidate, usually in a number of sections.

When compared to standard information extraction tasks, working on resumes offers specific challenges. In the exemplary system and method, Machine Learning (ML) is employed for contextual sequences learning and correction. The system and method provide an improvement over an existing entity extraction process for resumes, by adding a second step that takes advantage of regularities in the sequence of discovered entities.

Types of information which the system and method may extract from a resume include some or all of:

1. Personal information: e.g., candidate first name and last name, address, email, phone number, etc.
2. Education: e.g., diploma/degree, university, year.
3. Experience: e.g., date range, company/organization name, job title, skills used, salary.
4. Skills, languages, certifications.

FIG. 1 illustrates part of a loosely-structured document 10, such as a résumé. Entities 12, 14, 16, etc., to be extracted, e.g., company names (shown in italics), locations (shown underlined), dates (shown in bold, and job titles (shown in bold underlined), inside a given section 18 of the resume (here the work experience section), tend to be grouped or clustered together (location wise). In this example, four clusters 20, 22, 24, 26 of entities are seen and, in each entity cluster, the entities are semantically related (i.e., the date corresponds to the job title and to the company name of the cluster). Moreover, in each cluster, the entities generally follow a pattern chosen by the author (in this example "Organization, City, State/Country, Date range, new line, job title." This type of pattern is specific to each document and often also to each section in the document. The pattern illustrated here for the experience section, however, may be the same or similar for other sections, like the education section with school names, years and diplomas.

Conventional automatic extraction systems tend to miss some of the entity information observed in these author-selected patterns. For example, in the second cluster 22, the organization name and city have been missed. In the exemplary method and system, these contextual sequences of entities are automatically discovered and learned. The inferred patterns of entity classes are then used to complete the Information Extraction (IE) procedure, improving on the original system recall by finding new entities.

While the exemplary embodiment is described with particular reference to resumes, other types of document in which patterns of entities are observed but are not enforced are also contemplated, such as medical documents, documents containing a list of references, and the like.

Figure 2:
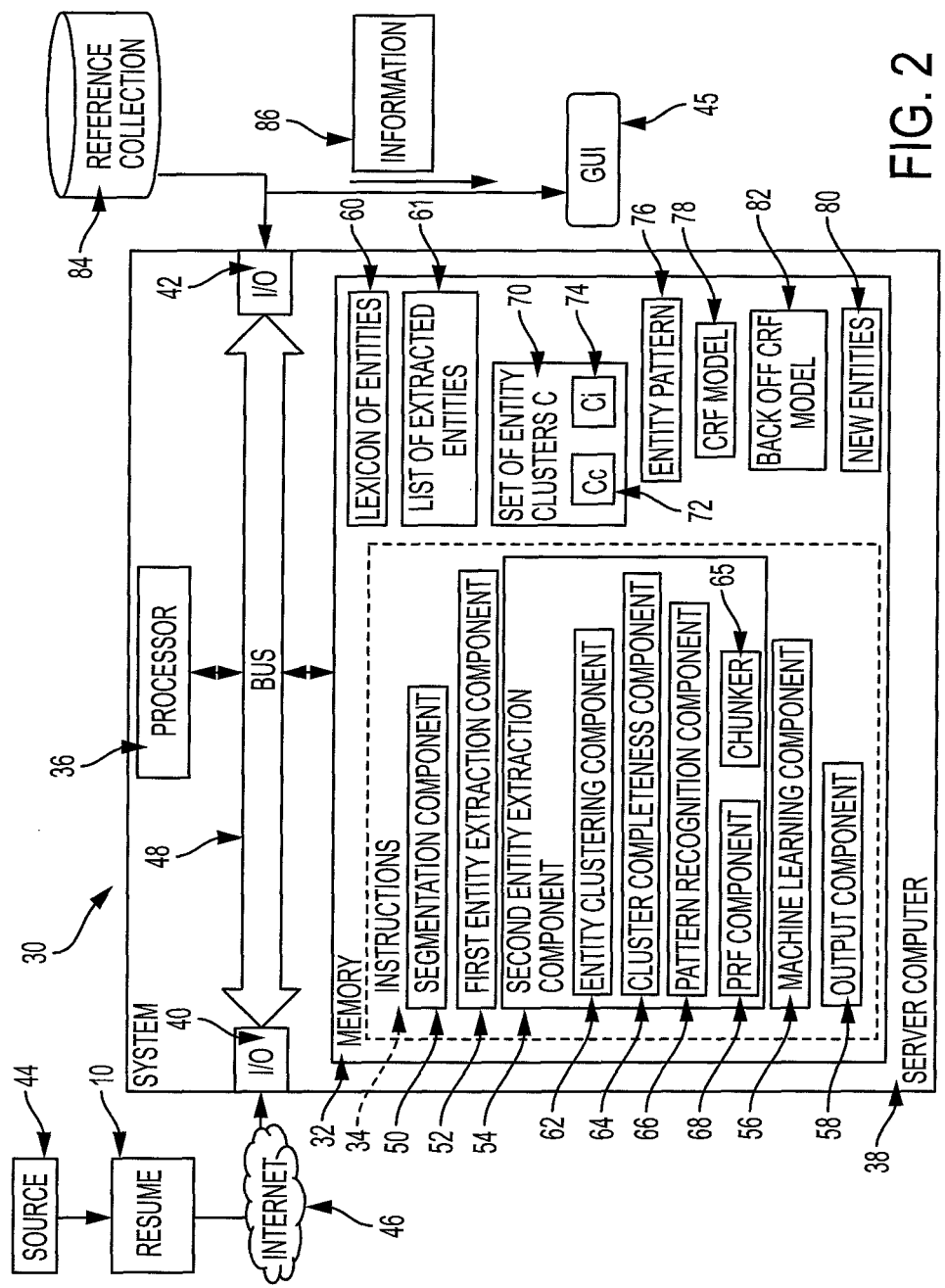
FIG. 2 is a functional block diagram of a system for entity extraction in accordance with one aspect of the exemplary embodiment.

FIG. 2 illustrates a computer-implemented system 30 for entity extraction from resumes. The system includes memory 32 which stores software instructions 34 for performing the method illustrated in FIG. 3 and a processor device 36 in communication with the memory for executing the instructions. The system 30 may be implemented by one or more computing devices, such as the illustrated server computer 38. One or more input/output devices 40, 42 enable the system to communicate with external devices, such as a source 44 of the resume and a graphical user interface (GUI) 45, via wired or wireless connections 46, such as the Internet. Hardware components 32, 36, 40, 42 of the system 30 communicate via a data/control bus 48.

The system 30 receives as input a text document 10, such as a resume, for processing. The resume may be an electronic document such as a Word document, or a scanned paper document. In the case of a scanned document, the document may be preprocessed, either by the system or elsewhere, using optical character recognition to extract the text content.

The exemplary instructions 34 include a segmentation component 50, a first entity extraction component 52, a second entity extraction component 54, a machine learning component 56, and an output component 58. Some of these components may be omitted.

The segmentation component 50 (optional) segments the document 10 into sections 18, e.g., based on document structure, such as lines between rows of text, section titles, paragraph breaks, combinations thereof, and the like. In one embodiment, the section starts are identified using a categorizer which is applied on each line of text. The categorizer may be, for example, a Probabilistic latent semantic analysis (PLSA) model trained on a set of section classes, such as the five classes: experience, education, skills, other, and none). In one embodiment the categorizer is trained to detect the beginning of each section, for example, by classifying each line as being a title or not.

The first entity extraction component 52 performs a first pass of entity extraction (or otherwise provides a set of extracted entities extracted external to the system to the second entity extraction component). Component 52 may be a conventional entity extraction component which has been trained to label entities 12, 14, 16, etc., in the text that fall within one of a predefined set of entity classes, such as at least two or at least three or at least four entity classes. The entity extraction component 50 may be a rule based extraction system or based on a probabilistic model, such as a Conditional Random Field (CRF) system, or a combination thereof. A suitable rule-based system 52 includes a parser which applies rules for tokenizing the text to form a sequence of tokens (generally, words), applying morphological tags (in particular, parts of speech, such as noun, verb, adjective, etc.), identifying noun clusters, and labeling the nouns/noun clusters with entity tags using, for example, an entity resource, such as a lexicon 60 of entities, in which the entities may each be labeled according to one of a predefined set of entity classes. In this case, the extraction of the first set of entities may include accessing the lexicon of entities and identifying text sequences (one or more tokens) in the section which each match a respective entity in the lexicon. Grammar rules may also be used to extract entities.

Tokenization involves splitting the text into tokens (generally words), often by looking for white spaces between characters. Morpho-syntactic analysis entails identifying candidate parts of speech (POS) for each word, such as noun, verb, adjective, adverb, which may be refined to a single part of speech per word as ambiguities are resolved and the most likely POS tags are assigned. This may performed via a combination of hand-written rules and hidden Markov Modeling (HMM). Proper nouns and Named Entities are identified and may be tagged as nouns. See, for example, U.S. Pat. Nos. 6,263,335, 6,311,152, 6,975,766, and 7,171,350, and U.S. Pub. Nos. 20080319978, 20090204596, 20100082331, and 20140163951, the disclosures of which are incorporated herein by reference. Chunking allows words to be grouped around a head to form noun phrases, adjectival phrases, and the like. Extraction of dependency relations (or simply dependencies) involves Extraction of dependency relations (or simply dependencies) may involve extracting SUBJ relations between a noun (or more generally, a noun phrase) and a verb in which the noun phrase serves as a subject of the verb, OBJ relations between a noun phrase that serves as an object of a verb, NOUN-ATTRIBUTE and NOUN-PREDICATE dependencies, and the like.

The parser 52 may provide this functionality by applying a set of rules, called a grammar, dedicated to a particular natural language such as French, English, or Japanese. The grammar is written in a formal rule language, and describes the word or phrase configurations that the parser tries to recognize. The basic rule set used to parse basic documents in French, English, or Japanese is called the "core grammar." Through use of a graphical user interface, a grammarian can create new rules to add to such a core grammar. In some embodiments, the syntactic parser employs a variety of parsing techniques known as robust parsing, as disclosed for example in Salah Mokhtar, et al., "Robustness beyond shallowness: incremental dependency parsing," in special issue of the NLE Journal (2002); U.S. Pat. No. 7,058,567; and Caroline Brun, et al., "Normalization and paraphrasing using symbolic methods," ACL: 2nd Intl Workshop on Paraphrasing, Paraphrase Acquisition and Applications, 2003. In one embodiment, the syntactic parser 52 may be based on the Xerox Incremental Parser (XIP), which may have been enriched with additional processing rules to facilitate the extraction of entities. The parser may be implemented with Java code, e.g., in Python script. Other natural language processing or parsing algorithms can alternatively be used.

CRF-based systems which may be employed as the first entity extraction component are described, for example, in John Lafferty, et al., "Conditional random fields: Probabilistic models for segmenting and labeling sequence data," *Int'l Conf. on Machine Learning (ICML)*, pp. 282-289, 2001.

Specific methods for extracting entities which may be used herein are disclosed, for example, in U.S. Pub. Nos. 20080071519, 20080071519, 20080319978, 20090204596, 20100082331, 20100004925, and 20150286629, the disclosures of which are incorporated herein by reference in their entireties.

The first entity extraction component 52 also identifies a location of each of the extracted entities, e.g., with offset precision or other location indicator. For example, each character (including spaces between tokens) is indexed in sequence. Each entity can them be located by its first index and its length. For example, entity 14, classed as City/State, may have the location: index 19, length 13. The output of the first entity extraction component 52 is a list 61 of extracted entities and respective entity classes and associated location information.

As will be appreciated, the components 50 and 52 may be part of an existing entity extraction system which is external to the system 30, and which feeds the list 61 of entities to the system 30.

The second entity extraction component 54 uses pattern recognition to identify entities which may have been missed in the first pass. The illustrated second entity extraction component 54 includes an entity clustering component 62, a cluster completeness component 64, a chunker component 65, a pattern recognition component 66, and optionally a pseudo-relevance feedback (PRF) component 68.

The entity clustering component 62 groups the entities (or at least a subset of them) in each section 18, that have been identified in the first pass, into clusters, based on the entity locations. Generally, at least some of the clusters including at least two entities, although some may include only one. A list (set) 70 of the identified entity clusters 20, 22, 24, 26 may be stored in memory 32. In particular, component 62 identifies the document-specific sequences of entities (and their respective classes) in each cluster, within the given resume or resume section. For example, for section 18 in FIG. 1, the first two clusters have an entity class sequence: ORG, CITY, STATE DATE NL (new line) JOB, where the punctuation (here commas) and formatting (here NL after DATE) between the entity classes is also recognized. The third cluster has a sequence STATE DATE NL JOB and the fourth cluster has a sequence ORG, CITY, STATE DATE.

The cluster completeness component 64 determines whether each cluster in the list 70 can be considered as complete or incomplete based on correlations observed between the sequences of entities. A list 72 of complete clusters Cc is generated. Remaining clusters are placed in a list 74 of incomplete clusters Ci.

The chunker component 65 processes the text in a window containing a respective cluster to identify a sequence of chunks of text.

If there are sufficient complete clusters in list 72, the pattern recognition component 66 uses the chunk sequences in the complete clusters to identify an entity pattern 76, which is a document-specific (and also section specific) sequence of entity classes. For example, a document-specific CRF model 78 uses the complete clusters as learning material for identifying the document-specific sequence of entity classes 76. Given the entity pattern 76, one or more of the incomplete clusters Ci may be supplemented by identifying new entities 80. These are text sequences which comply with the pattern and which have not previously been identified as entities. As a result, one or more of the incomplete clusters may be recognized as complete clusters and added to the list of complete clusters 72.

In the case where incomplete clusters remain after the CRF model 78 has been applied, or if there is insufficient training material (no complete cluster), the pattern recognition component 66 may use a back-off CRF model 82 to identify further new entities 80. The back-off CRF model 82 may be trained on all the known complete clusters in the list 72 (supplemented with any additional complete clusters identified) and/or on clusters in a reference collection 84 of clusters extracted from other documents.

The optional PRF feedback component 68 applies Pseudo-relevance Feedback Heuristics to identify additional entities.

The optional machine learning component 56 may use the extracted entities for learning a model for extracting other information from resumes, e.g., based on user feedback (such as: these are resumes of people we would want to consider, these are resumes we do not want to consider further).

The output component 58 outputs information 86 extracted by the first and second entity extraction components 52, 54, such as the sequences of entities and their classes, e.g., in table format or other structured data format. In another embodiment, the information output may be an annotated version of the input document 10.

The computer-implemented system 30 may include one or more computing devices 30, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 32 may represent any type of non-transitory computer readable medium such as random access memory (RAM), read only memory (ROM), magnetic disk or tape, optical disk, flash memory, or holographic memory. In one embodiment, the memory 32 comprises a combination of random access memory and read only memory. In some embodiments, the processor 36 and memory 32 may be combined in a single chip. Memory 32 stores instructions for performing the exemplary method as well as the processed data 61, 70, 76, etc.

The network interface 40, 42 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 36 can be variously embodied, such as by a single-core processor, a dual-core processor (or more generally by a multiple-core processor), a digital processor and cooperating math coprocessor, a digital controller, or the like. The digital processor 36, in addition to executing instructions 34 may also control the operation of the computer 38.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
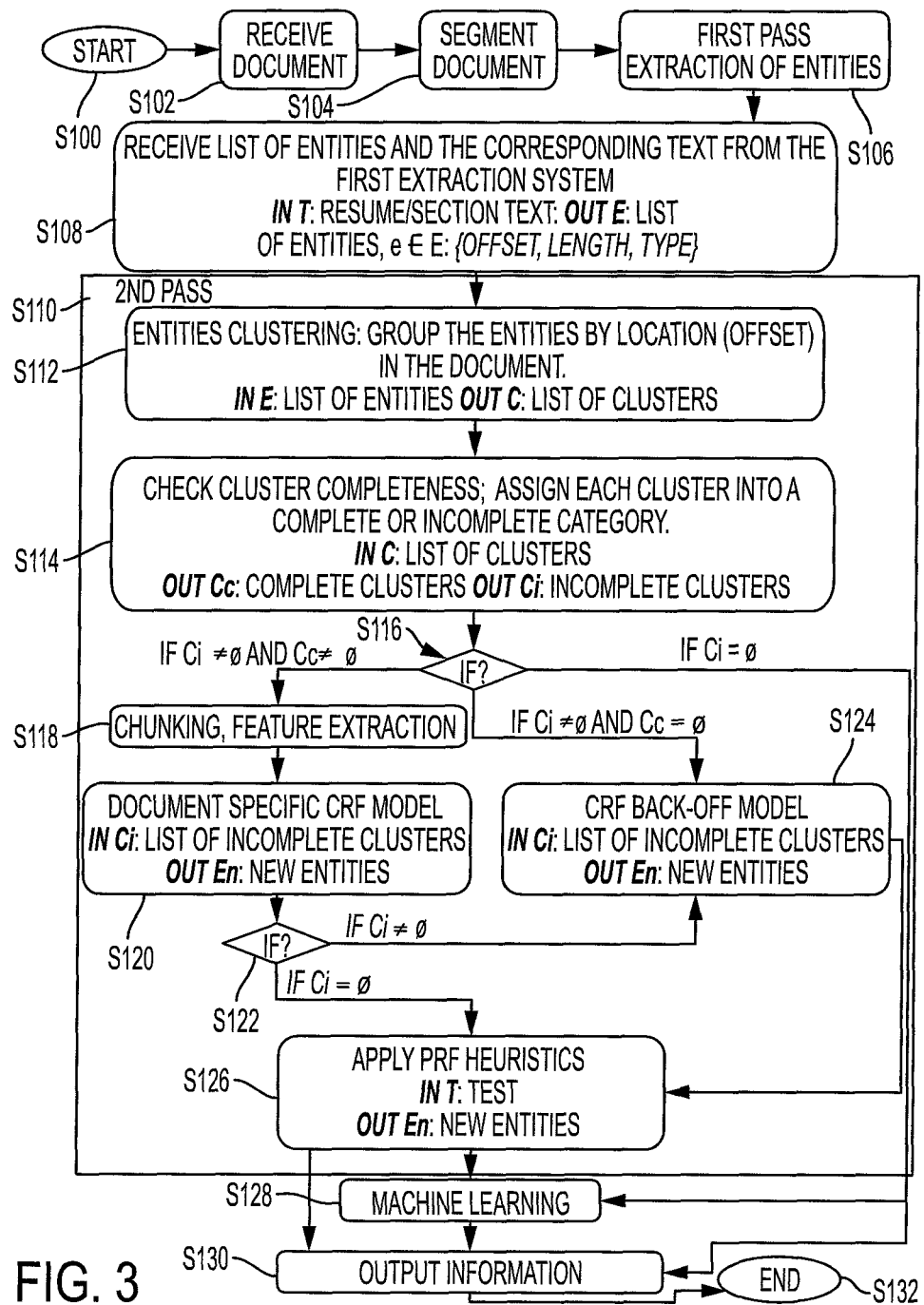
FIG. 3 is a flow chart illustrating a method for entity extraction in accordance with another aspect of the exemplary embodiment.

FIG. 3 illustrates a method for entity extraction which may be performed with the system of FIG. 2. The method begins at S100.

At S102, an input document 10 is received.

At S104, the document may be segmented into sections 18, using the segmentation component 50.

At S106, a first set of entities is extracted from one of the sections (or entire document) by component 52, e.g., in the form of a list 61. This first pass entity extraction process may include identifying entities in predefined classes and their locations (offsets) in the document/section. In some embodiments S102-S106 are performed in a preliminary method and the input to the exemplary method is the extracted entities and corresponding text.

At S108, for each extracted entity in the list 61 generated in the first pass, its offset, length, and type (class) is stored.

At S110, a second pass entity extraction process is performed, by component 54, which may include identifying new entities and their locations in the document/section based on pattern recognition.

S110 may include the following substeps:

At S112, entity clustering is performed. The input to this step is the list of entities identified in the first pass and their locations and the output is a list 70 of clusters C and their respective entities.

At S114, cluster completeness is evaluated, by component 62. The input to this step is the list 70 of clusters and the output is a list 72 of complete clusters, denoted Cc and a list 74 of incomplete clusters, denoted Ci.

If at S116, enough complete clusters are available (such as at least one), the method proceeds to S118 where features are extracted from text in a window including a cluster. This may include processing the text in the window to identify chunks of text, with the chunking component 65, and extracting features from the chunks. The method then proceeds to S120, where the features extracted for the complete clusters are used as learning material for identifying document-specific sequences of entities by the pattern recognition component 66.

If at S122, there are still incomplete clusters after S120 (Ci is not empty), or if at S116, there is not enough training material (no complete cluster at all), the method proceeds to S124, where a back-off CRF model 82 is used to search for additional entities. The back-off CRF model 82 may be trained on all the known complete clusters in the list 80 (including the newly-generated complete clusters), the ones in the reference collection 94, or a combination thereof.

At S126, pseudo-relevance feedback (PRF) heuristics may be applied to retrieve additional entities or to match the newly added entities to the predefined classes (e.g., by applying surface variations like acronyms, deletion of known suffixes/prefixes, lower/uppercase variations, and the like).

Optionally, at S128, machine learning may be performed to enable clustering/classification of documents based on the extracted entities.

At S130, information 86 may be output by the system, based on the entities identified in at least the second pass. For example resumes may be associated with metadata for each of the identified entities which can be used to highlight (e.g. with different colors) or otherwise distinguish the entities when shown on the GUI 45. Relevant documents, as identified by the machine learning model, may be displayed first or shown in a cluster.

The method ends at S132.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 38, (for example, an internal hard drive of RAM), or may be separate (for example, an external hard drive operatively connected with the computer 38), or may be separate and accessed via a digital data network such as a local area network (LAN) or the Internet (for example, as a redundant array of inexpensive of independent disks (RAID) or other network server storage that is indirectly accessed by the computer 38, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method will now be described by way of example.

Entities Clustering (S112)

In this step, the entities are grouped into clusters. While various methods may be employed to identify the clusters, in practice, the semantically related entities are located close together, within the document.

Figure 4:
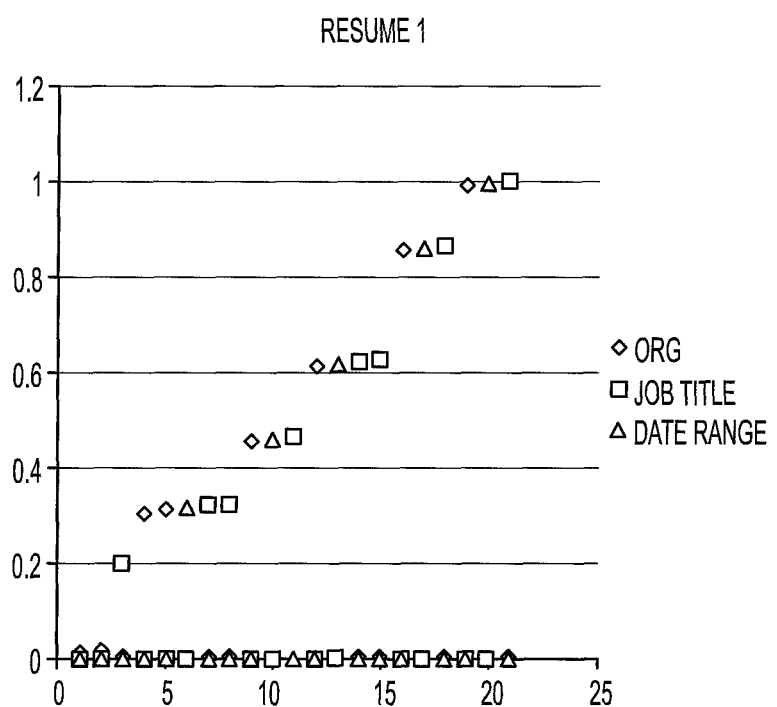
FIGS. 4 and 5 are graphs of example resumes in which each entity is plotted by apparition order (horizontal axis) and relative position inside the document (vertical axis)
Figure 5:
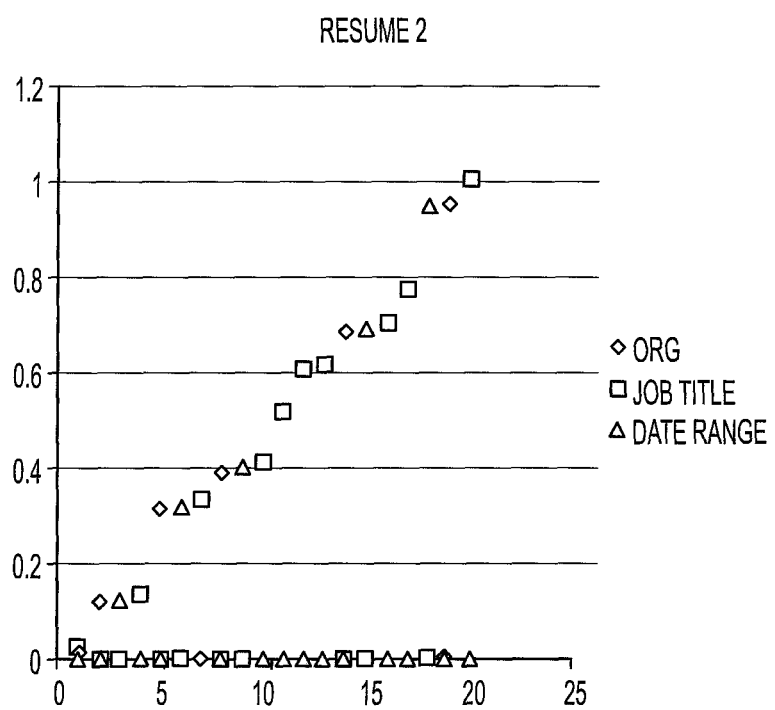

As shown in FIGS. 4 and 5, for two example resumes, where each entity is plotted by apparition order (horizontal axis) and relative position inside the document (vertical axis), the clusters of entities are observed to form plateaux inside the document.

To find these closely located entities, an agglomerative clustering algorithm, based on offsets of the entities, may be employed. The algorithm aggregates entities inside a cluster if the distance from a dynamically computed representative location in the cluster, such as the cluster centroid or medoid, is below a threshold distance r (maximum radius around the representative location).

If the distance to the centroid is larger than r, a new cluster is initialized with the entity offset as the new centroid. The radius r may be selected empirically, or based on factors such as the character size, size of document, maximum offset, combination thereof, or the like.

An entity clustering algorithm including operations to obtain a list of clusters from a list of entities and a given radius r is shown in Algorithm 1.

---
Algorithm 1: Entities clustering
---

Returns a sorted list of clusters of entities for a given document/section.
Input
E: the entities extracted from a given document or section
∀ e ∈ E: {offset}
r: the maximum radius around the centroid of a cluster
Output
cls: the ordered list of clusters of entities
∀ c ∈ cls: {centroid, entities}
Algorithm
Cluster[ ] cluster(E)
    let cls = [ ] // dynamic list of clusters
    sortByOffsetIncreasing(E)
    for e in E do
        if c is nil
            // initialize the cluster from the entity if no cluster
            exists
            let c = new Cluster
            c.entities.add(e)
            recomputeCentroid(c.centroid)
            cls.add(c)
        else
            if e.offset - c.centroid ≤ r
                // nothing, this entity is inside the radius
                // it will be added to the cluster later
            else
                // initialize a new cluster
                let c = new Cluster
                cls.add(c)
            end
            // add the entity to the cluster & recompute the
            centroid
            c.entities.add(e)
            recomputeCentroid(c)
        end
    endfor
    return cls
endcluster
recomputeCentroid(c)
    // compute the centroid of the cluster relative to the entities offsets
    c.centroid = sum(c.entities.offset) / length(c.entities)
end The algorithm takes as input the list 61 of entities denoted E and for each entity e in E, a respective location (offset). The offset can be computed as the number of characters up to and including the first character in the entity from the start of the document or section. The entities are then sorted according to their offsets. For each entity in turn, if the number of clusters is zero (i.e., this is the first entity) then a new cluster is generated using this entity. The centroid of this cluster is based on the location of this entity (e.g., based on its offset and length). The cluster is added to the list of clusters cls. If, on the other hand, the number of clusters is not zero, then the distance (in number of characters) from the current entity's offset to the cluster centroid is determined. If the distance is less than or equal to r, it will be added to the current cluster and the centroid of that cluster is recomputed based on the offsets of the entities in the cluster. For example, the cluster centroid is computed as the sum of the offsets of the entities in the cluster divided by the length of the entities in the cluster. If the distance to the current cluster centroid is greater than r, a new cluster will be initialized with this entity.

Several variations of this algorithm are contemplated which may enhance the clustering:

In one embodiment, a dynamic radius computation is used. In practice, the distance between clusters tends to vary depending on the relative location inside the document. One reason for this is that authors tend to describe in more detail the most recent professional experiences, resulting in large gaps between the firsts clusters, assuming an inverse chronological order is used. The less recent experiences are often described in less detail, particularly for experienced people, so there are smaller gaps between these clusters. In this embodiment, r may decrease with increasing offsets, e.g., be an approximately inverse function of the offsets of the entities in a cluster.

As will be appreciated, not all the entities are systematically inside a cluster. These entities are sometimes outliers (see the word Java 90 in FIG. 1), which may have been (erroneously in this case) labeled as a LOCATION entity.

Cluster Completeness Computation (S114)

Given the list of clusters and the respective clustered entities, a distinction is made between complete and incomplete clusters. Those in first category are used to learn the existing patterns of entities inside the document/section and, those in the latter become candidate clusters for completion.

To determine whether each cluster is complete an analysis of the numbers of entities of each type in a given section may be performed. For example, a correlation coefficient (e.g., Pearson's product-moment coefficient) may be computed for co-occurrence of entities in pairs of types (e.g., selected from number of job titles, number of company names, number of dates and so forth). If the coefficient is high, this indicates that these entity types can be expected to be found in the same cluster for each cluster in the section.

Pearson's product-moment coefficient is computed as follows:

$$\rho_{x,y} = corr(X, Y) = \frac{\text{cov}(X, Y)}{\sigma_X \sigma_Y} = \frac{E[(X - \mu_X)(Y - \mu_Y)]}{\sigma_X \sigma_Y},$$

Figure 6:
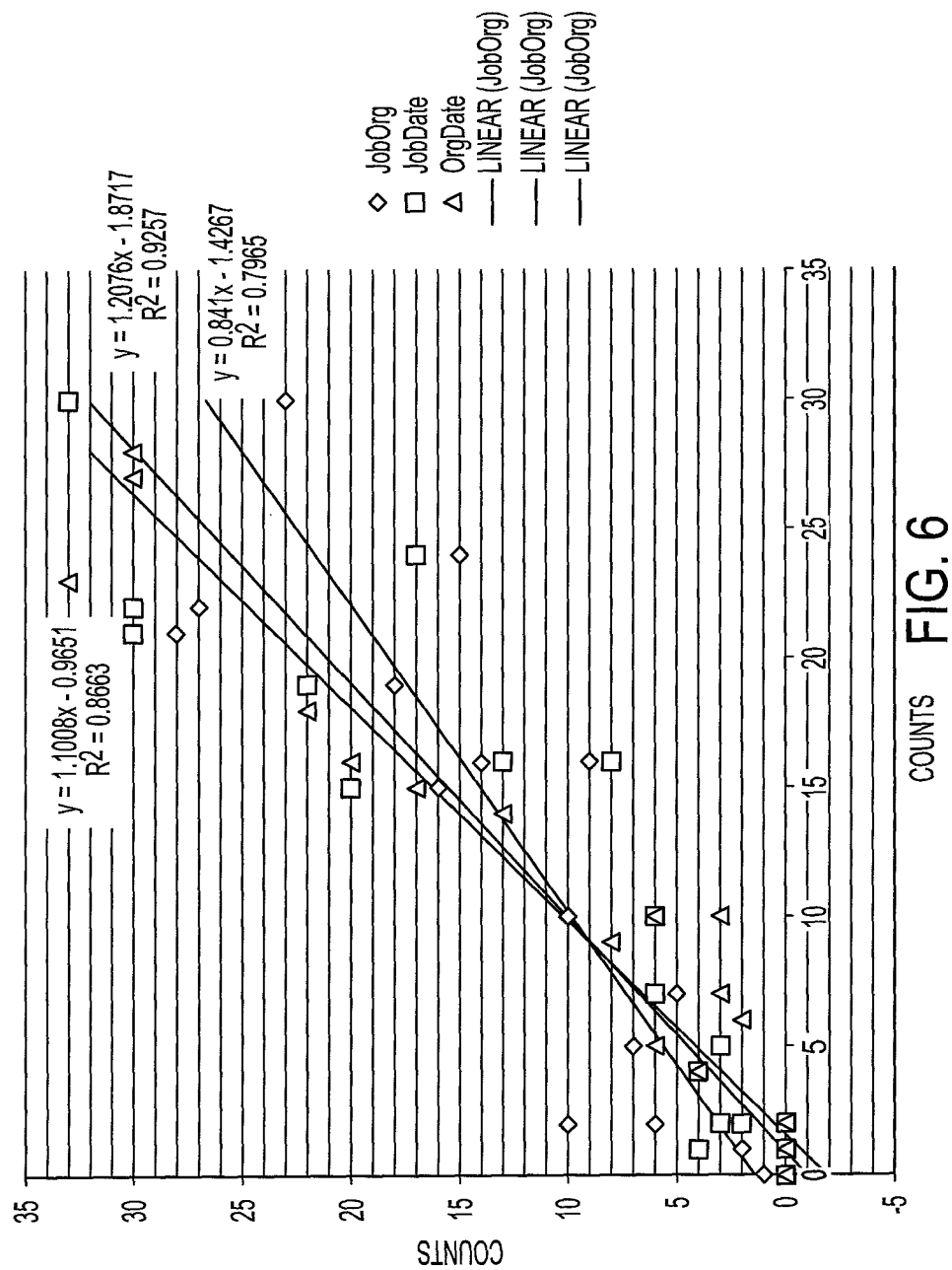
FIG. 6 is a graph which illustrates linear dependence for pairs of variables.

As shown in FIG. 6, where each pair of entity types is displayed, there is a high degree of linear dependence between the numbers of entities (high $\rho^2$) for three pairs: JOB:ORG ($R^2$=0.7965), JOB:DATE ($R^2$=0.8663), and ORG:DATE ($R^2$=0.9257).

An indicator of cluster completeness can be defined as the number of types of entity within a given entity cluster. It may be assumed, for example, that the number of entities types are equal in each cluster. A threshold number of entity types may be defined for each section for a cluster to be considered complete. For example, for each experience in the experience section in FIG. 7, it may be assumed that there must be at least one job title, one date range and one company name. The same can be applied to other sections in the resume, such as the education section, where a strong correlation coefficient between the number of dates, school names, and diplomas is observed.

This approach provides a split of the list of clusters into a "complete clusters" list (having at least a threshold number of the specified entity types represented in the cluster, which may depend on the correlation coefficients obtained for the entity types) and an "incomplete clusters" list (having less than the threshold number of the specified entity types represented in the cluster).

With the output of step S114 (the lists of complete and incomplete clusters), the patterns of the entities can be learned from the complete clusters. These automatically discovered patterns can then be used to complete the incomplete clusters. Conditional Random Fields (CRF), as described in Lafferty 2001 may be used.

In the case where no incomplete clusters are identified at S114, the method may proceed directly to S128 or S130.

If incomplete clusters remain, but there is no example of a complete cluster the method proceeds to S124.

Otherwise, the method proceeds to step S118.

Chunking and Feature Extraction (S118)

S118 includes selecting a text search window 92 (FIG. 1) for each complete and incomplete cluster. This provides the learning data and the window of text in which to search for new entities. In one embodiment, this may include considering one additional line of text around each cluster boundary, or a specified number of words before the first identified entity and after the last identified entity (such as up to twelve words or up to six words at each end). However, other methods can be used to select boundaries, such as boundaries learnt from previous samples, boundaries which decrease in size throughout a section (as for the cluster radius), combinations thereof, and the like.

From a cluster and the associated text search window 92, features are extracted for learning (e.g., basic elements such as words, tokens, etc. and their features). There is a challenge due to the often small number of learning samples. For example, there may be only one, two or three complete cluster examples per resume. To address the problem of few training samples, and allow inference of the document specific patterns, the input text is transformed to allow a comparison between the complete and incomplete clusters texts. In particular, the chunker component 65 assists the machine learning component to learn from very few samples by minimizing the ambiguities.

As an example, consider the two examples 94, 96 found in the same resume shown in FIG. 7, which have been annotated by the first pass CRF model 78. The first example 94 is the search window of a complete sample and the second one 96 is the search window of an incomplete one (missing organization).

In that case, for the incomplete cluster, the first extraction component 52 may not have had the name "Citigroup" in its dictionary 60, or, in a learning scenario, the system may not have seen the term during the training phase. Unlike the first cluster, there is no company name indicator to help the extraction (such as the suffix "Inc.").

Looking at the layout of the first example, it can be inferred that the company name in the second is probably on the third line. To make use of this layout information, the chunker component 65 partitions the text in the window 92 into blocks or chunks, using syntactic and semantic rules.

The chunker component 65 may employ tokenization and syntactic and semantic features provided by a syntactic parser 52, such as the Xerox Incremental Parser (XIP), in addition to the results of the first extraction component 52 to split the text into chunks. In the exemplary embodiment, a chunk can be:

1. An existing entity, as provided by the first extraction component (job title, date ranges, . . . ).

2. An existing "semantic block" (or basic named entity) as identified by the parser rules (e.g., country, US state, simple date, time expression, . . . ).

3. A continuous block of text sharing simple syntactic features, such as uppercase, all uppercase or no uppercase.

In addition to these syntactic and sematic rules used to extract the chunks, some or all of the following separators may be used for chunking:

1. Syntactic markers: such as new lines, punctuation marks (period, comma, parenthesis, quotes, etc.), and part of speech elements such as conjunctions (for, and . . . ) and the ampersand symbol (&).

2. Semantic markers: the given token is listed in a lexicon of markers, such as organization markers (Inc., Corp, GmbH, SA . . . ), schools markers (university, school . . . ) or group markers (department, dept., group, team . . . ).

For example, as illustrated in FIG. 7, for each cluster window, a sequence of text chunks is identified using one or more of the chunking rules. As an example, the chunk sequence of the complete cluster window is JOB DATE NL UPP GRP NL UPP ORGM NL UPP PUNCT UPP COMM UPP, where:

JOB=identified job entity
DATE=identified date entity
NL=new line
UPP=upper case chunk
GRP=group (here based on finding group marker—"Team" and two capitalized words together)
ORGM=identified organization entity
PUNCT=punctuation marker (:)
COMM=comma
CHK=generic chunk, not assigned to any of the other types These sequences can be used as simple features which are input to the CRF model 78 to learn patterns.

In one embodiment, the new features may be added to an existing extraction model, such as that described in Klügl, "Context-specific Consistencies in Information Extraction," Würzburg University Press, 2014. For example, this may be achieved by adding features related to the extracted entities (e.g., dates, locations, etc.) to the $1^{st}$ pass CRF model. However, since the number of added features is relatively small in relation to other features, there may be little impact on performance. Additionally, such a CRF model does not do well at dynamically adapting the extraction system to a specific document.

Pattern Learning (S120)

Looking at the two sequences in FIG. 7, common patterns can be inferred between the two blocks of text (common elements highlighted in bold, underlined. For pattern learning, a new CRF model 78 is dynamically trained, which is specific to the given document, with the output of the chunking component. The text chunks corresponding to each of the complete clusters are therefore used as the sequence to be learned by the CRF model 78.

The dynamically trained CRF model 78 is then used to label chunks of the text windows corresponding to the incomplete clusters. The labels provided by the CRF output are then used to reconstitute newly discovered entities.

For example, in the case of FIG. 8, the CRF model 78 may learn a pattern that includes the features JOB DATE NL UPP GRP NL UPP ORGM NL UPP from complete clusters and thus is able to predict that the uppercase chunk Citigroup on the third line of the incomplete cluster window 96 is an organization-type entity.

These new entities are added to the incomplete clusters. Then, clusters that became complete (following the same decision rules described earlier) are removed from the incomplete cluster list. These new clusters can thereafter be used to enrich the training data (complete clusters) for an additional loop on this step.

If the pattern learning step is not able to complete all the incomplete clusters the method may proceed to S124.

As an alternative to a CRF model 78, a deep-neural network architecture can be used for extraction of features, such as a Recurrent Neural Network (RNN) using a Long Short Term Memory (LSTM) architecture. See, for example, Sepp Hochreiter, et al., "Long short-term memory," Neural Computation 9(8) pp. 1735-1780, 1997.

Applying the CRF Back-Off Model (S124)

In some cases, the document-specific CRF model 78 is unable to complete all the incomplete clusters, due, for example, to small variations in the sequences of entities. For example the last added experience may not be formatted as for the previous ones. Or, in other cases, it may not be possible to train a CRF model, for example in the case where there is no complete cluster to learn from. In such cases, where incomplete clusters remain, a back-off CRF model 82 is employed, which can use information external to the document as training data. For example, training data is obtained from the complete collection of documents 84, or even a collection independent training set, to find additional named entities in a resume.

1. Collection Specific Model

To complement the information gathered from the section/document context, the context can be extended to the collection of documents from which the resume was drawn. This collection can be a manually organized corpus sharing common data or a subset of a larger collection that was split using topic modelling techniques to extract semantically similar items. For example, a collection of resumes for software engineers (such as the cluster of software engineers resumes from which the current resume is drawn) are expected to contain patterns of entities that may help to complete the incomplete clusters of entities.

To avoid loss in precision, or at least minimize it, this step is performed only after using the document specific CRF model is employed (if this is possible). The following steps can be used: gathering all the complete clusters from the collection; obtaining the corresponding text windows and chunking them to create a training corpus, as described for S118; learning a collection specific CRF model 82 from this training data and applying the learned CRF model 82 to the incomplete clusters of the resume, as described for S120.

2. Collection Independent Model

To extend the context of the CRF back-off model further, for example, if the collection-specific back-off model is not able to complete all the incomplete clusters or there are insufficient documents in the collection, previously seen collections of documents may be used as a training corpus for the statistical model. These documents may be similar to the document being processed or to the ones in the collection. For example, a collection of resumes obtained for a different job posting may be used in the case of resumes. This helps to ensure that the type of information sought is similar and may share some common patterns. For example, an experience in a resume will I contain a job title, a date range and some company or organization name, closely located and following a chosen pattern irrespective of the job for which the person is applying.

Pseudo-Relevance Feedback Heuristics (S128)

In this step, a contextual keyword based text search may be employed to identify syntactic variations of entities in the list 61, using previously extracted entities from different parts of the document or from other documents. This can be used to find additional instances in the text.

To limit the potential loss in precision, the search may be limited to the entities in complete clusters. This assumes that an entity, for example a company name, closely related (by the clustering) to a date range, a location and a job title has a higher probability of being correctly extracted (i.e., not a false positive). This provides greater confidence that the observed surface form (as seen in the text) can be used to generate alternative surface forms for finding new instances of the same entity in the document.

For example, a company name may be used in full the first time it is mentioned in the resume, but in an abbreviated form in subsequent mentions. The entity extraction components 52, 54 may miss such acronyms. But after a first pass, these missed instances can be searched for by using exact string matching or approximate string matching techniques or surface variation generation.

1. Missed Exact or Approximate Matches

In this step exact string matching and simple approximate string matching (by known prefix removal, e.g. LLC, LTD . . . ) are used. For example in the case of the experience section, for each of the company/organization names found in the complete clusters list for other sections, this may include:

1. Searching for exact matches in the experience section (or other section under consideration) (exact string matching).

2. Checking for presence of know company suffixes, e.g., using a lexicon of such suffixes (e.g., llc, ltd . . . ) and removing them if present (e.g., Excellon Software Ltd.→Excellon Software; Daratech, Inc.→Daratech).

3. Other simple syntactically correct variations may be generated, such as switching between lowercase and uppercase forms, removing country name/state suffixes (e.g., ALCATEL INDIA→ALCATEL→Alcatel), and the like.

4. These simple variations are then used to search for other instances of the entity in the text.

These simple, rule based variations, are well suited to finding new instances of named entities. However, but more dynamic and complex systems can be used to generate new variations that are syntactically and semantically correct.

2. Dynamic Surface Variations

More complex surface variations may also be used to find new entities. For example, acronym generation is used in the case of multi-token entities. Also, in addition of the static lexical resources, surface variations can be learned from an existing corpus. For example, the TF-IDF frequency of common terms can be used to extract company/organization suffixes that are not present in the predefined lexicons.

Common pre/suffixes may be learned for a specific domain. For example, from a "software companies" oriented corpus containing entities such as LNTS TECHNOLOGIES, BBN TECHNOLOGIES, using frequency-based methods, the term TECHNOLOGIES may be identified as a common suffix for company names even though it is not present in a generic lexicon of company name suffixes. Such prefixes can thus be identified and removed/added to create variants of company names Acronyms can be used instead of the full name to create variants for searching, e.g., University of Central Florida→UCF.

More complex rules may be provided to generated acronyms such as PricewaterhouseCoopers, L.L.P.→PwC; Guangzhou Aircraft Maintenance Engineering Company→GAMECO.

Implementation of such rules, based on frequencies and some simple syntactic rules, improves the recall while maintaining a high precision because of the contextual application of these rules.

Machine Learning

The entities extracted from the resumes can be used to learn a classifier model, e.g., a binary classifier, for distinguishing between good and bad resumes.

An example implementation of the second pass entity extraction of the system can used for resume screening. The example system accepts as input any file in a format supported by the Apache Tika toolkit (Java API for metadata and text extraction from a large variety of documents: PDF, Word, OpenOffice, HTML . . . ). The extracted text is saved in UTF-8 and some character normalization is applied (like quotes, new lines, etc.). For segmenting the resume in sections, four main section types are used: Work experience, Education, Skills and Others (from hobbies to publications). The section identification is performed by identifying the section start using a categorizer on each line of text (PSLA model trained on the five classes: experience, education, skills, other, and none). With the CV segmented in sections the entity extraction part ($1^{st}$ and $2^{nd}$ passes) is performed. When the entity extraction is complete, the documents and entities are presented to the user through a user interface as described in Caroline Privault, et al., "A new tangible user interface for machine learning document review," *Artificial Intelligence and Law*, 18(4) pp. 459-479, 2010. The touch-based application allows the user to annotate documents, categorize and cluster them, to search for predefined key words or relevant terms provided by CX (KL divergence). Other useful metrics, such as the Mahalanobis distance for outlier detection are also computed and provided to the user (e.g., the number of entities per type in the experience section are shown with the Mahalanobis distance expressed by a color scale).

Without intending to limit the scope of the exemplary embodiment, the following examples illustrate the application of the method to resumes.

EXAMPLES

Evaluation Data Sets

Several data sets of resumes were obtained, each one in a specific industry domain:

1. CV200 (software engineers): this set was built manually from resumes found on the Internet, manually anonymized, text extracted from the original format (Word, PDF or HTML), manually annotated with the BRAT annotation tool available at http://brat.nlplab.org/(about 6300 entities), and randomly split into 100 documents for training/learning and 100 for evaluating/testing.

2. BUS (business managers): proprietary dataset (about 7000 text documents in total, about 200 of which are manually annotated).

3. GUST (customer care professionals): crawled from the a job portal, text automatically extracted from HTML, annotations automatically extracted from semantic tags inside the original HTML document, manual correction of the annotations.

The human annotations of the corpora were cross-validated by different people in the team. Only the results on the CV200 are presented here.

An example of a CV200 resume annotated with the BRAT annotation tool is shown in FIG. 8.

Table 1 provides statistics on the CV200 data set (experience section only, 201 documents including job description).

TABLE 1

| CV200 corpus statistics | | | |
|---|---|---|---|
| Entity Class | JobTitle | Org | DateRange |
| AVG No. of Annotations | 6.104 | 6.333 | 5.443 |
| MEDIAN No. | 6 | 6 | 5 |
| STD deviation | 3.558 | 3.973 | 2.936 |
| MIN No. of Annotations | 0 | 0 | 0 |
| MAX No. of Annotations | 20 | 25 | 14 |
| VARIANCE | 12.661 | 15.784 | 8.635 |

Figure 9:
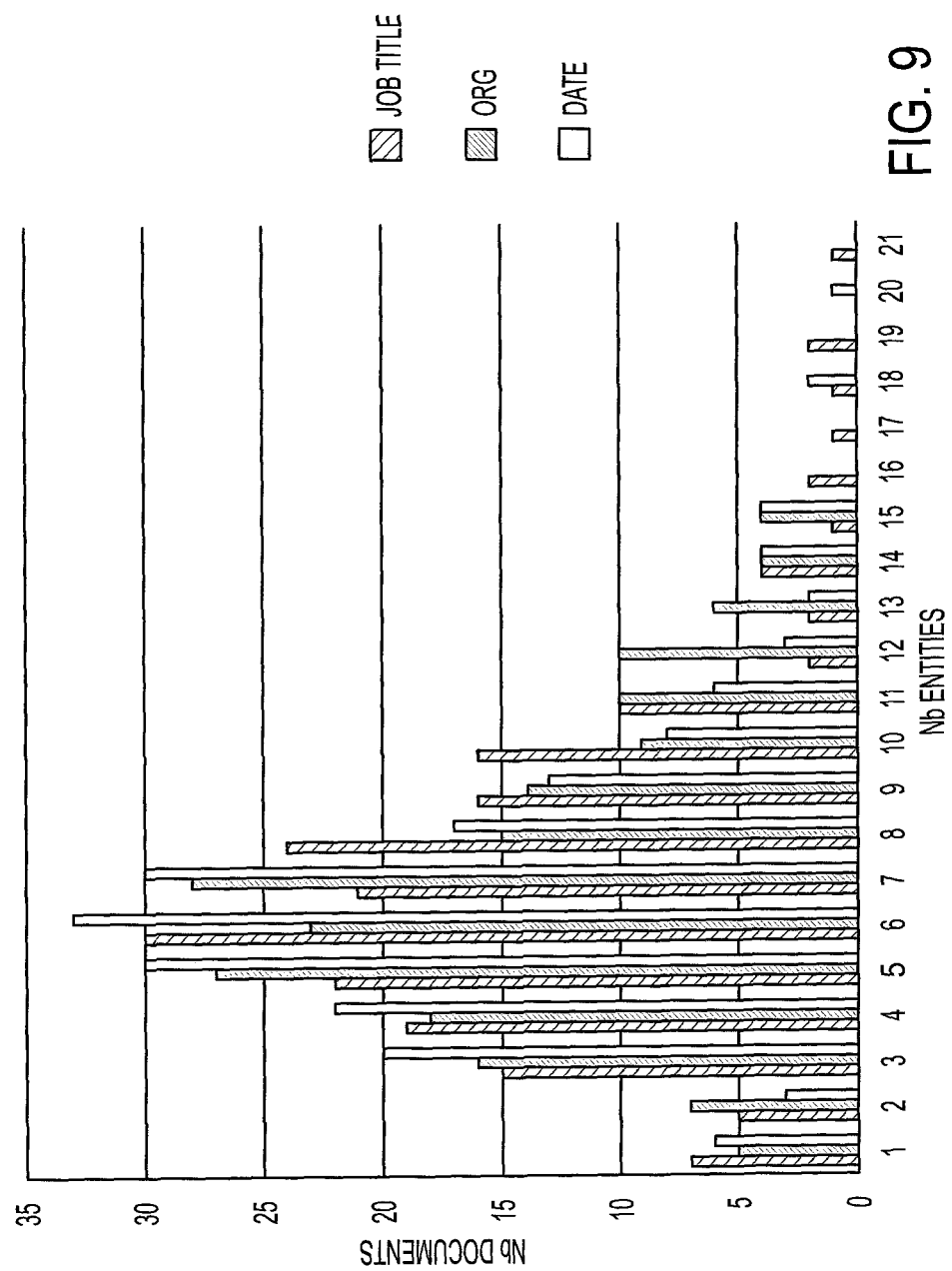
FIG. 9 is a block graph showing number of documents in which different numbers of entities for each of three types are found for one section of a set of resumes.

FIG. 9 graphically illustrates these results.

Evaluation Methodology

The CV200 dataset was randomly split in two, the first part serving as a training/development set and the second part for the evaluation. For scoring the performance, Precision, Recall, and F1 metrics are applied per entity type on each document. The documents scores are averaged to give the collection entity extraction scores per type of entity.

To decide if an entity was correctly extracted, the overlap criteria, as described in: A. Lavelli, et al., "A critical survey of the methodology for IE evaluation," Proc. $4^{th}$ Intl Conf. on Language Resources and Evaluation (LREC 2004), 2004, are used. In this case, an entity is accepted as a true positive if it overlaps the gold standard (manual annotation). A predicted instance overlaps an actual instance if there are at most k neighboring tokens, and maximum/missing tokens. (k=2, l=1 in the present case).

The second pass entity extraction was evaluated on top of two different first pass entity extraction methods:

1. XIP: A rule based extraction system (using XIP rules and Java code for the extraction). The XIP system, as described above, is a rule based system for which an English grammar has already been developed in detail, and which includes an entity recognition system for dates, organizations, and professions. The definition of those entities, however, does not match the definitions that were chosen to be applied in the resume extraction. For that reason, the existing rules and lexicons as were used where possible, supplemented with resume-specific data (lexicons, features, rules . . . ).

2. CRF: A CRF based extraction system (using CRF++ command line tools for token sequences learning using XIP as a features generator). The sequence is built from the XIP tokenization and the model uses the following syntactic and semantic features:

a. Surface form (i.e., the token as seen in the document by XIP).

b. Syntactic class (e.g. PUNCT, NADJ, NOUN), +hand-crafted (DATE, COMMA, PAREN).

c. Basic syntactic features for uppercase and all uppercase tokens (UPP and ALLUP).

D. Semantic features related to organization extraction (ORG, ORGHEAD, ORGMOD, ORGEND), extracted by XIP. Examples of ORGHEAD (beginning of an organization term): University, School; Laboratory. Examples of ORGEND (end of an organization term): ltd, llc, corp. ORG and ORGMOD include other keywords without specific location inside a given token sequence.

e. Semantic features related to person and places extraction (C_PERSON, PROF, PLACE). Examples of C_person (person in charge): President, manager, . . . .

f. Semantic features generated by converting from the grammar to resume features (ENT=ORG).

g. About 180 sequences relations features functions (relations between features of successive token on a window size of 10 tokens).

Baseline results for these two systems were provided by an information extraction platform. The baseline systems achieve F1 scores of 0.56 (XIP) and 0.69 (CRF).

Results on Top of a Rule Based System (XIP)

When the complete second pass entity extraction method was applied (with document-specific CRF model, CRF back-off model, and surface variations matching) on top of the rule based extraction system, a significant improvement was observed (recall ~+18 and precision ~+11). A final F1 score of 0.72 (~+16) was obtained. While the increase in recall was expected, an increase in the precision was also seen, meaning that the predictions made by the $2^{nd}$ pass system more accurate than the baseline system.

Results on Top of a Statistical System (CRF)

When the complete second pass entity extraction method was applied on top of a CRF-based entity extraction component, a significant increase in recall (~+5.4) and a limited loss of precision (~−2.0) were observed. The CRF model used in the first pass was already a very good system.

The results indicate that the exemplary system and method are able to take into account the contextual structure of the documents to extract new named entities. This solution improves the extraction quality on rule based systems but also on statistical IE systems such as CRFs.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An automated method for extracting entities from a text document comprising:
   for at least a section of a text document,
      extracting a first set of entities in predefined classes of entity from the at least a section, the extraction of the first set of entities comprising at least one of a rule-based extraction method and a probabilistic extraction method;
      identifying a location of each of the extracted entities in the at least a section of the document;
      clustering at least a subset of the extracted entities in the first set into clusters, based on the identified locations of the entities in the document;
      identifying complete clusters of entities and incomplete clusters of entities from the clusters, based on correlations observed between sequences of entities in the clusters and a number of the classes of entity within each entity cluster;
      learning patterns for extracting new entities based on the complete clusters; and
      extracting new entities from the incomplete clusters based on the learned patterns,
   wherein the extracting of the first set of entities, identifying complete clusters, learning patterns, and extracting new entities are performed with a processor device.

2. The method of claim 1, wherein the text document is a resume.

3. The method of claim 1, further comprising segmenting the document into sections and performing the extracting of entities, identifying complete clusters, learning patterns and extracting new entities for one of the sections.

4. The method of claim 1, wherein the extraction of the first set of entities includes accessing a lexicon of entities to identify text sequences in the section which each match a respective entity in the lexicon.

5. The method of claim 1, wherein the extracted entities are each labeled with an entity class from the predefined classes of entity classes.

6. The method of claim 1, wherein the clustering includes ordering the extracted entities based on their locations in the document, initializing a cluster with a first of the ordered entities, adding a next entity to the first cluster if the distance to a representative location in the cluster is less than a threshold distance, and recomputing the cluster representative location, otherwise if the distance is greater than the threshold, initializing a next cluster.

7. The method of claim 1, wherein the identifying complete clusters of entities from the clusters includes identifying clusters which include at least a threshold number of entity classes.

8. The method of claim 7, wherein the threshold number is determined by identifying correlations between entities of the different classes occurring in a set of documents or document sections.

9. The method of claim 7, wherein a threshold number of entity classes is defined for each section for a cluster in that section to be considered complete.

10. The method of claim 1, wherein the learning patterns comprises training a CRF model based on the complete clusters and the extracting new entities based on the learned patterns comprises predicting new entities in incomplete clusters based on the trained CRF model.

11. The method of claim 1, wherein the learning patterns comprises, for each of the clusters in the set of complete clusters, for a window of text which includes the cluster, chunking the text using a set of rules to generate a sequence of chunks and extracting features of the chunks in the sequence, the features being used to learn the patterns.

12. The method of claim 1, further comprising, after extracting new entities based on the learned patterns, identifying new complete clusters which include the new entities and repeating the learning of patterns and extracting the new entities with the new complete clusters.

13. The method of claim 1, further comprising, after extracting new entities based on the learned patterns, if incomplete clusters remain, applying at least one of:
   a) a back-off model trained on information extracted from other documents, and
   b) pseudo-relevance feedback,
   to identify additional new entities.

14. The method of claim 13, wherein the back-off model is a CRF model.

15. The method of claim 1, further comprising outputting the extracted new entities or information based thereon.

16. A computer program product comprising a non-transitory storage medium storing instructions, which when executed on a computer, causes the computer to perform the method of claim 1.

17. A system comprising memory which stores instructions for performing the method of claim 1 and a processor in communication with the memory for executing the instructions.

18. A system for extracting entities from text documents comprising:
   a first entity extraction component for extracting a first set of entities from at least a section of a text document, each of the extracted entities being in one of a predefined set of entity classes;

a second entity extraction component for extraction of new entities from the at least the section of the text document, the second entity extraction component comprising:

a clustering component for clustering at least a subset of the extracted entities in the first set into clusters, based on locations of the entities in the document and their entity classes, a cluster completeness component for identifying complete clusters of entities and incomplete clusters of entities from the clusters, based on correlations observed between sequences of entity classes in the clusters, and a pattern recognition component for learning patterns of the entity classes for extracting new entities based on the complete clusters and extracting new entities from the incomplete clusters based on the learned patterns; and a processor for implementing the first and second entity extraction components, clustering component, cluster completeness component, and pattern recognition component.

19. The system of claim 18, further comprising at least one of:

a segmentation component for segmenting the document into sections;

a chunking component which for each of the clusters in the set of complete clusters, for a window of text which includes the cluster, chunks the text using a set of rules to generate a sequence of chunks and extracting features of the chunks in the sequence, the features being used to learn the patterns; and an output component which outputs the extracted new entities or information based thereon.

20. A method for extracting entities from a resume comprising:

segmenting the resume into sections;

extracting a first set of entities and respective entity class labels from the section with at least one of grammar rules, a probabilistic model, and a lexicon;

clustering at least a subset of the extracted entities in the first set into clusters, based on locations of the entities in the resume;

identifying complete clusters of entities and incomplete clusters of entities from the clusters, based on correlations observed between sequences of entity class labels in the clusters;

learning patterns for extracting new entities based on the class labels of the entities in the complete clusters;

extracting new entities from the incomplete clusters, based on the learned patterns; and outputting information based on the extracted new entities in the resume, wherein the segmenting, extracting the first set of entities, clustering, identifying complete clusters, learning patterns, and extracting new entities are performed with a processor device.

\* \* \* \* \*